United States Patent [19]

Larsen et al.

[11] Patent Number: 4,912,642
[45] Date of Patent: Mar. 27, 1990

[54] COORDINATED ENGINE AUTOTHROTTLE

[75] Inventors: Hals N. Larsen, Redmond; John L. Doherty, Kirkland, both of Wash.

[73] Assignee: The Boeing Company, Seattle, Wash.

[21] Appl. No.: 92,760

[22] Filed: Sep. 3, 1987

[51] Int. Cl.[4] ............................................. G06F 15/46
[52] U.S. Cl. ........................... 364/431.01; 364/431.07; 60/39.281; 244/182
[58] Field of Search ........... 364/431.01, 431.2, 431.05, 364/442, 431.07; 244/182, 191, 175, 76 B; 60/39.281

[56] References Cited

U.S. PATENT DOCUMENTS

| | | | |
|---|---|---|---|
| 2,978,210 | 4/1961 | Larson | 244/77 |
| 3,517,509 | 6/1970 | Bayati | 60/226 |
| 3,538,760 | 11/1970 | Atkey et al. | 73/117.4 |
| 3,648,033 | 3/1972 | Bader | 235/150.21 |
| 3,777,122 | 12/1973 | Borsboom | 235/150.1 |
| 3,797,233 | 3/1974 | Webb et al. | 60/39.16 R |
| 3,813,063 | 5/1974 | Martin | 244/77 D |
| 3,852,956 | 12/1974 | Martin | 60/39.15 |
| 3,971,208 | 7/1976 | Schwent | 60/39.03 |
| 3,981,442 | 9/1976 | Smith | 235/150.2 |
| 4,007,204 | 3/1978 | Itoh | 60/39.28 R |
| 4,100,731 | 7/1978 | James et al. | 60/39.15 |
| 4,173,119 | 11/1979 | Greune et al. | 60/39.16 R |
| 4,205,814 | 6/1980 | Larson et al. | 244/182 |
| 4,209,734 | 6/1980 | Osder | 318/564 |
| 4,220,993 | 9/1980 | Schloeman | 364/431 |
| 4,296,601 | 10/1981 | Martin | 60/224 |
| 4,344,141 | 8/1982 | Yates | 364/442 |
| 4,410,948 | 10/1983 | Doniser et al. | 364/431.01 |
| 4,490,792 | 12/1984 | Deutsch et al. | 364/431.07 |
| 4,593,523 | 6/1986 | Hawes | 60/39.281 |
| 4,794,755 | 1/1989 | Hutto, Jr. et al. | 60/39.281 |

Primary Examiner—Eugene R. LaRoche
Assistant Examiner—Seung Ham
Attorney, Agent, or Firm—Christensen, O'Connor, Johnson & Kindness

[57] ABSTRACT

An integrated engine control-autothrottle control system for controlling changes in the thrust of a jet aircraft engine during transients (i.e., changes in speed) in a manner that prevents throttle lead and overshoot (i.e., exceeds the response capability of the engine) is disclosed. The system uses the engine control to continuously monitor current fuel flow (WF), burner pressure (PB), high rotor speed (N2) and engine thrust (EPR), manipulates the signals and produces limiting fuel flow transient error (WFPBERR) and rotor speed transient error (N2DOTERR) signals for both acceleration and deceleration. The lower parameter transient error signal is selected as the controlling limit signal during acceleration and the higher parameter transient error signal is selected as the controlling limit signal during deceleration. The controlling limit signals are used to produce limiting throttle lever angle rate of change signals—+TRADOT for acceleration and −TRADOT for deceleration. The throttle lever angle rate of change signals denote the maximum rate at which the throttle can be advanced (+TRADOT) or retarded (−TRADOT) without exceeding the response capabilities of the engines. The TRADOT signals are transmitted to the autothrottle and used to limit fuel flow changes so that the response capability of the aircraft is not exceeded.

18 Claims, 8 Drawing Sheets

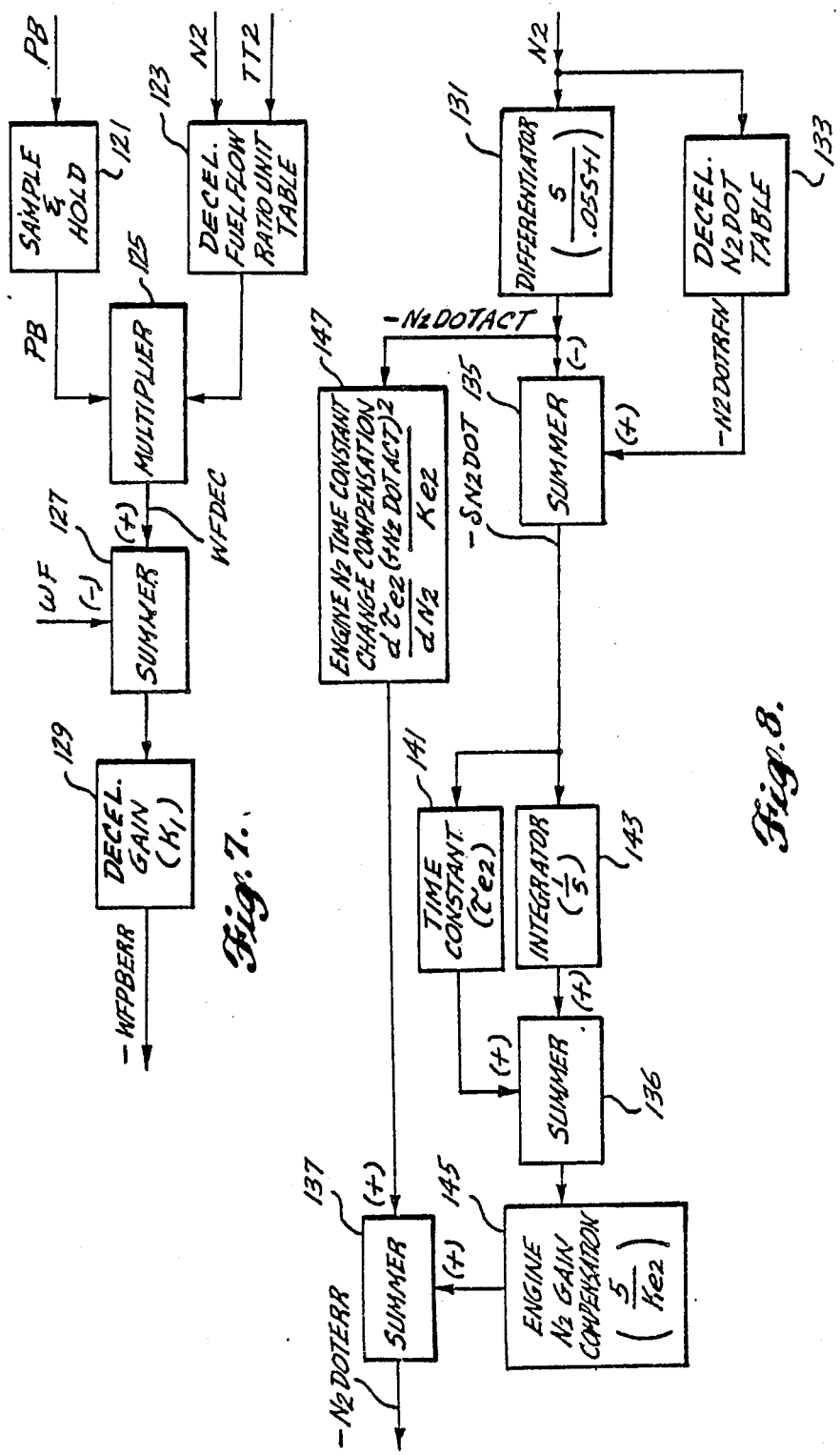

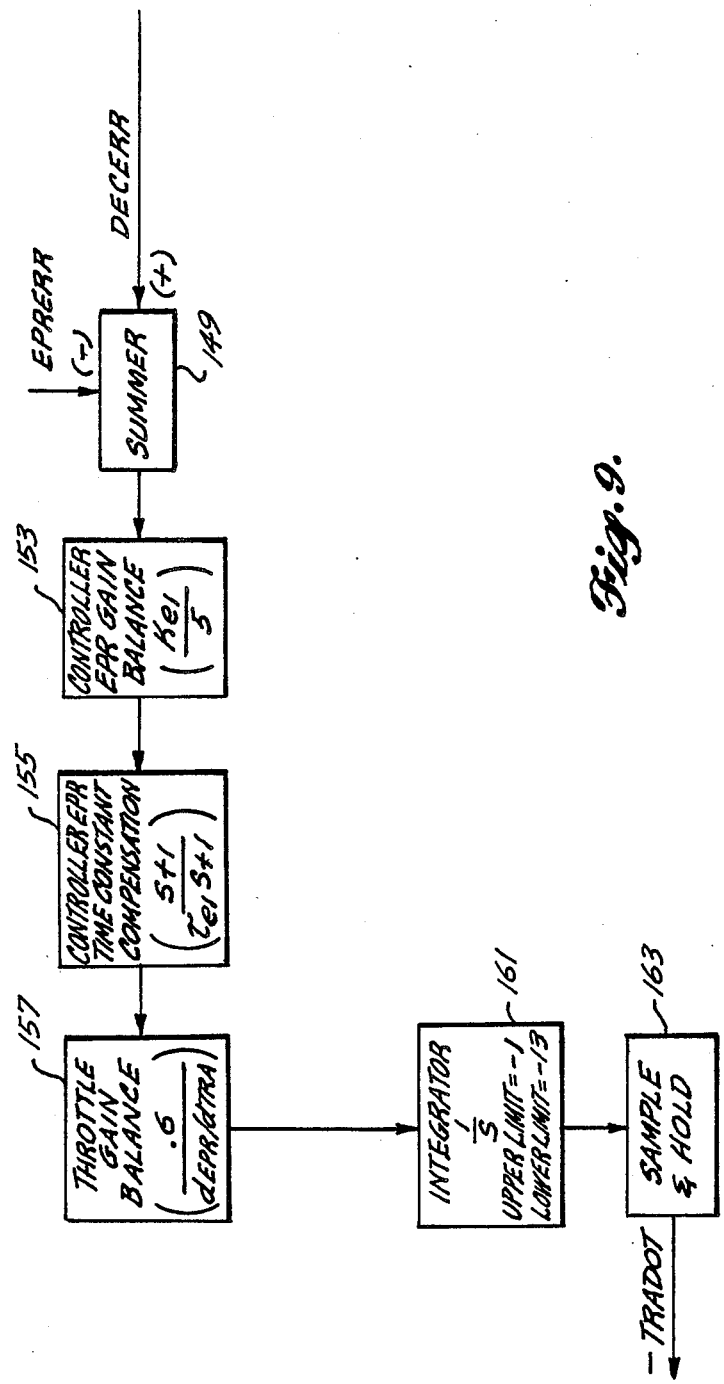

COORDINATED ENGINE AUTOTHROTTLE

TECHNICAL AREA

This invention relates to jet engine control systems and, more particularly, to the integration engine control systems and autothrottle systems.

BACKGROUND OF THE INVENTION

Autothrottle systems are utilized on many jet aircraft, particularly commercial jet aircraft, to provide automatic control of engine thrust. Thrust is increased by advancing the throttle and decreased by retarding the throttle. The flow of fuel to the engines of the aircraft is metered by the engine control in response to the throttle inputs.

One goal of an aircraft autothrottle system is to change thrust as rapidly as possible during transients, i.e., changes in speed. A difficulty arises when throttle changes are made too rapidly. The engine control will limit the rate of fuel flow change to maintain stable engine operation during the transient. When this occurs the engine control(s) operate at saturation, e.g., they operate at their fuel flow to burner pressure ratio limit or their maximum rate of change of rotor speed limit. When operating at these limits, throttle lever angle leads engine thrust. This can result in the throttle lever angle overshooting the target lever angle position and/or engine thrust overshooting the target thrust level. In either case, unnecessary throttle adjustments are required to achieve the target condition.

The majority of prior attempts to improve autothrottle-engine response characteristics have centered on the autothrottle side of the overall system. Sophisticated autothrottle computers have been developed. Such computers are programmed with information regarding the aircraft engine's response characteristics and monitor several engine parameters in an attempt to properly schedule throttle rate during transients. Such systems have several disadvantages. Significant amounts of computer storage space are required to store engine response characteristics. Further, the stored information must be updated for each new engine type. Also, because the engine data is for a nominal engine, it may not always accurately reflect the response of a particular engine. In addition, prior autothrottle-engine response systems have required either several dedicated wires or significant space on a data bus in order to receive the required engine parameter signals. Overall, prior systems designed to improve the autothrottle-engine response characteristics have involved a great deal of engineering development work that must be repeated for each new engine to be certified. Much of this work represents a duplicity of effort as the propulsion staffs of both the engine manufacturer and the aircraft manufacturer develop a great deal of engine transient response characteristic information for each type of engine utilized on commercial and other aircraft. Further, even these sophisticated attempts to improve autothrottle-engine response have not been entirely satisfactory and have not achieved the optimum response.

SUMMARY OF THE INVENTION

In accordance with this invention, a closed loop control system for controlling the autothrottle of a jet aircraft engine during transients (i.e., changes in speed) in a manner that prevents overshoot (i.e., exceeds the response capability of the engine) while maintaining maximum response capabilities is provided. In essence, the system uses the engine control system to continuously monitor engine parameters and, based on those parameters, determines the maximum rate at which the autothrottle may be moved without exceeding the response capability of the engine.

The presently preferred formed of the invention continuously monitors current fuel flow (WF), burner pressure (PB), engine core rotor speed (N2) and engine thrust (engine low rotor speed—N1, or engine pressure ratio—EPR). The monitored WF, PB and N2 conditions are manipulated in a manner that produces a fuel flow transient error signal for both acceleration and deceleration (ACCERR, DECERR). The steady state error signal (e.g., EPRERR or N2ERR) is subtracted from the controlling transient error signal, i.e., ACCERR or DECERR, to create a limiting error signal. The limiting error signal is compensated for engine control system and autothrottle dynamics to provide the desired stability and response. The result is integrated to produce throttle lever angle rate of change signals—+TRADOT for acceleration and −TRADOT for deceleration. The throttle lever angle rate of change signals denote the maximum rate at which the throttle can be advanced (+TRADOT) or retarded (−TRADOT) without exceeding the response capability of the engines. The TRADOT signals are used to limit throttle position changes during speed transients (i.e., acceleration and deceleration) so that the response capability of the engine is not exceeded, thereby providing a coordinated autothrottle-engine response.

In accordance with further aspects of this invention, the transient error signals ACCERR and DECERR are produced using standard control laws. More specifically, ACCERR is the lower one of an acceleration fuel flow transient error signal (+WFPBERR) and an acceleration rotor speed transient error signal (+N2DOTERR) and DECERR is the higher one of a deceleration fuel flow transient error signal (−WFPBERR) and a deceleration rotor speed transient error signal (−N2DOTERR). The fuel flow transient error signals (+WFPBERR, −WFPBERR) are determined by multiplying burner pressure (PB) times an acceleration or deceleration ratio unit limit value whose magnitude is based on N2 and engine inlet total temperature (TT2). The current fuel flow (WF) is subtracted from the result of the multiplication. The ratio unit limit error signal values are based on the traditional acceleration and deceleration cams of a hydromechanical control. The result of the subtraction is multiplied by a gain to provide the desired loop response. The result is the acceleration and deceleration fuel flow transient error signals (+WFPBERR, −WFPBERR). The acceleration and deceleration rotor speed transient error signals (+N2DOTERR, −N2DOTERR) are determined by differentiating N2 and subtracting therefrom an acceleration or deceleration N2DOT reference signal whose value is scheduled with N2. The result of the subtraction is passed through a lead-integrator. The lead time compensates for the dominant time constant of the engine's WF to N2 transfer function. The resultant signal is multiplied by a gain that sets the desired loop response characteristic. N2DOTERR is obtained by summing the resultant signal with a signal derived from the output of the differentiator.

In accordance with still other aspects of this invention, the lower one of the +WFPBERR and +N2DOTERR signals in the case of acceleration, and the higher one of the −WFPBERR and −N2DOTERR signals in the case of deceleration, is used to limit the change in fuel flow to the engine. The same transient error signals (ACCERR and DECERR) are used as references in the determination of +TRADOT and −TRADOT. More specifically, a steady state thrust error signal (EPRERR) is subtracted from ACCERR and DECERR. The resulting signals are multiplied by the gain of the engine's WF to EPR transfer function, compensated for the time constant of the engine's WF to EPR transfer function and balanced for throttle gain. The TRADOT signals are produced by integrating the results of this manipulation. The integration is limited to the range of +13 to −13 degrees per second, which represents the maximum capability of the autothrottle servo.

As will be readily appreciated from the foregoing summary, the invention provides a control system suitable for controlling the autothrottle of a jet engine during transients in a manner that prevents overshoot while providing maximum response capability, thereby providing coordinated autothrottle engine response. This is accomplished by monitoring sensed engine parameter signals and manipulating the sensed signals by combining and compensating them in a manner that creates signals that can be used to directly control engine autothrottles in a manner that provides maximum engine response capability and coordinated throttle-engine transients.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 3 is a block diagram illustrating simplified EPR, N2 and PB to fuel flow transfer functions for a jet engine;

FIG. 7 is a block diagram of a deceleration fuel flow subsystem suitable for use in FIG. 2;

FIG. 8 is a block diagram of a deceleration rotor speed rate of change subsystem suitable for use in FIG. 2;

FIG. 9 is a block diagram of a deceleration throttle lever angle rate of change subsystem suitable for use in FIG. 2;

DESCRIPTION OF THE PREFERRED EMBODIMENT

As will be readily understood by those familiar with jet engine autothrottle control systems, the following description of a preferred embodiment of the invention only describes the components of an autothrottle system that are combined together to form a working embodiment of the invention. Subsystems that are not related to the invention are not described. In addition, in order to be most easily understood, the invention is illustrated and described in functional block form. In addition to describing the functions performed by the various subsystem blocks, the following description, and the drawings, set forth the transfer functions of the various subsystem blocks. Since transfer functions can be performed in software form, as well as hardware form, it is to be understood that the invention could be embodied in either form and that the terminology subsystem and circuit are to be taken descriptively and not as limiting the invention to circuitry embodiments of the invention.

Figure 1:
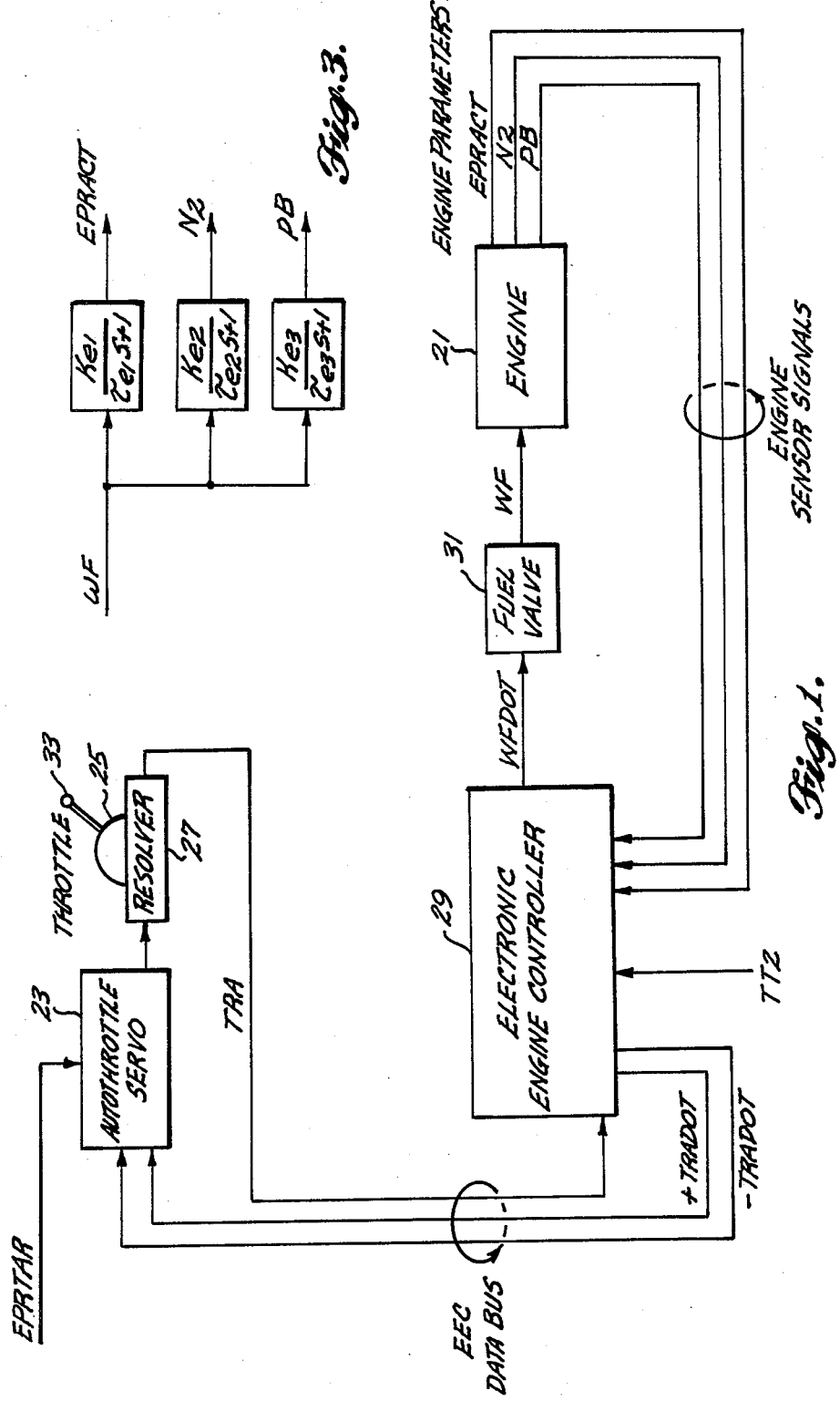
FIG. 1 is a block diagram of an autothrottle/engine system including a coordinated engine autothrottle control formed in accordance with the invention.

FIG. 1 is a system diagram that illustrates an autothrottle/engine system that includes a coordinated engine autothrottle control formed in accordance with the invention. More specifically, in addition to an engine 21, FIG. 1 includes: an autothrottle servo 23; a throttle 25, which includes a resolver 27; an electronic engine controller 29; and, a fuel valve 31. The setting of the throttle 25 can be controlled manually via a handle 33 or electronically via the resolver 27. When the aircraft is in an autothrottle mode of operation, the autothrottle servo 23 controls the position of the resolver 27 in accordance with the magnitude of a target engine pressure ratio signal denoted EPRTAR. Alternatively, in some aircraft, the autothrottle servo may be controlled by a target low speed rotor (N1) signal. The autothrottle can also move the throttle to control another parameter such as airspeed, mach number, etc. In any event, the resolver 27 produces a throttle resolver angle (TRA) signal that denotes the position of the throttle 25. The TRA signal is applied to the electronic engine controller 29.

The electronic engine controller also receives selected engine parameter signals, namely: a signal denoting the actual EPR of the engine (EPRACT); a signal denoting the speed, e.g., RPM, of the core rotor of the engine 21 (N2); and, a signal denoting the burner pressure (PB) of the engine. The electronic engine controller 29 also receives an inlet total temperature signal (TT2). The electronic engine controller 29 produces a fuel control signal (WFDOT) that is applied to the fuel valve 31. Based on this signal, the fuel valve 31, which integrates WFDOT, controls fuel flow (WF) to the engine 21. In accordance with the invention, the electronic engine controller 29 also produces two limiting error signals denoted +TRADOT and −TRADOT. +TRADOT and −TRADOT are used by the autothrottle in a manner that prevents the autothrottle servo 23 from driving the throttles 25 in a manner that will cause them to lead the engine during transients. Thus, +TRADOT and −TRADOT prevent the engine 21 from overshooting EPRTAR as a result of a throttle change that is rapid enough to exceed the response capabilities of the engine. Exceeding the engine response capabilities means that the engine response will lag TRA such that an engine speed or thrust overshoot is likely to occur. Engine overshoot usually results in the need to make additional throttle adjustments, which is undesirable both from engine/aircraft response and pilot attention points of view.

Figure 2:
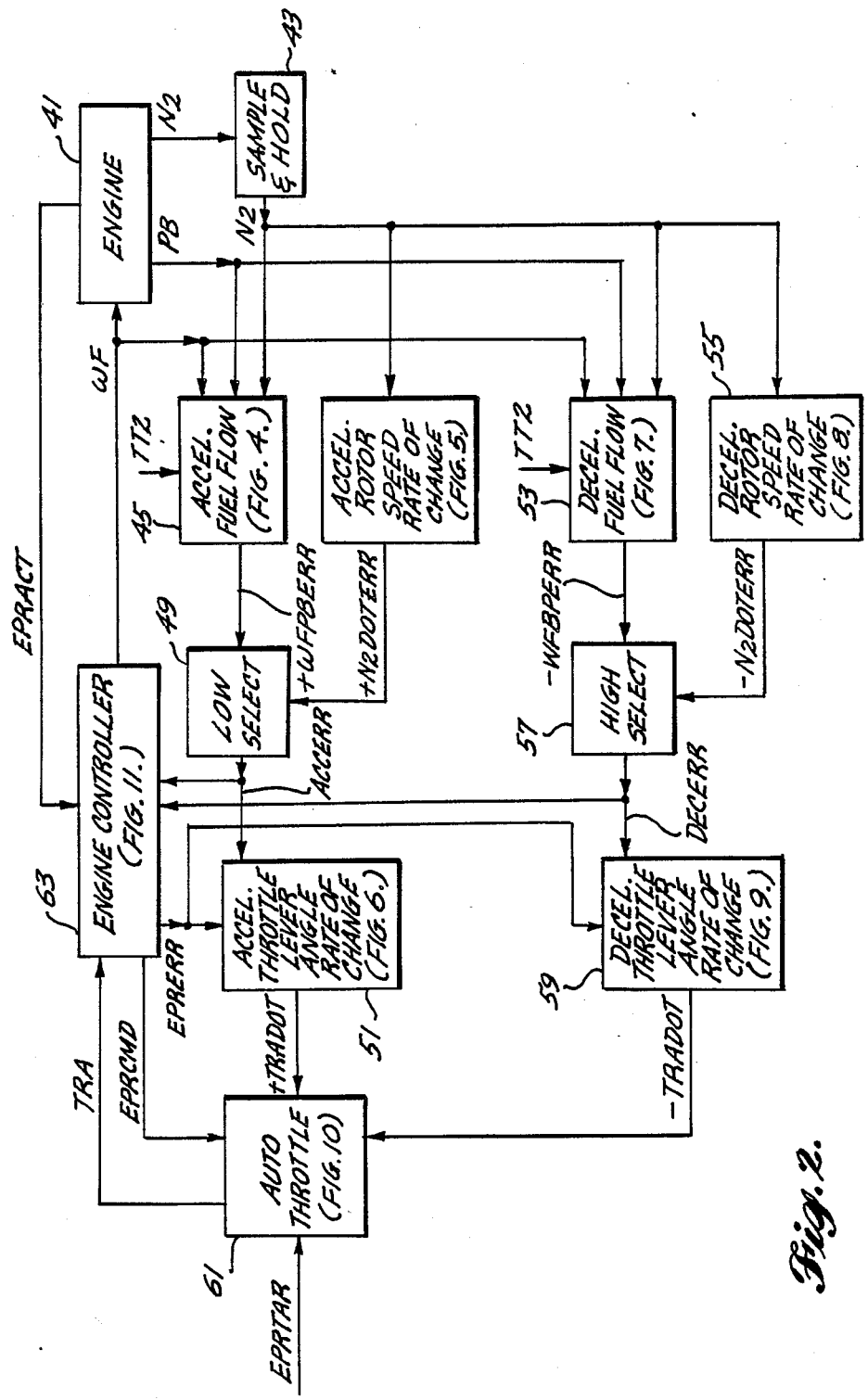
FIG. 2 is a block diagram illustrating a coordinated engine autothrottle control formed in accordance with the invention in combination with the engine being controlled.

FIG. 2 is a detailed system block diagram illustrating a preferred embodiment of a coordinated engine autothrottle formed in accordance with the invention and the engine 41 being controlled. The embodiment of the invention illustrated in FIG. 2 includes: a sample and hold circuit 43; an acceleration fuel flow subsystem 45; an acceleration rotor speed rate of change subsystem 47; a low select circuit 49; an acceleration throttle lever angle rate of change subsystem 51; a deceleration fuel flow subsystem 53; a deceleration rotor speed rate of change subsystem 55; a high select circuit 57; a deceleration throttle lever angle rate of change subsystem 59; an autothrottle subsystem 61; and, an engine controller subsystem 63.

The core rotor speed (N2) signal produced by the N2 sensor associated with the engine 41 is applied to the sample and hold circuit 43, which samples the N2 signal at predetermined intervals and stores the result until the next sample occurs. The stored N2 signal is applied to: the acceleration fuel flow subsystem 45; the acceleration rotor speed rate of change subsystem 47; the deceleration fuel flow subsystem 53; and, the deceleration rotor speed rate of change subsystem 55. The burner pressure (PB) signal produced by the burner pressure sensor associated with the engine 41 is applied to the acceleration fuel flow subsystem 45 and to the deceleration fuel flow subsystem 53. The engine pressure ratio (EPRACT) signal produced by the EPR sensor associated with the engine 41 is applied to the engine controller subsystem 63. A fuel flow (WF) signal produced by the engine controller subsystem 63 and denoting fuel flow to the engine 41 is applied to the acceleration fuel flow subsystem 45 and to the deceleration fuel flow subsystem 53. The acceleration and deceleration fuel flow subsystems 45 and 53 also receive engine inlet total temperature (TT2) signals from a temperature sensor associated with the engine 41.

Figures 4, 5:
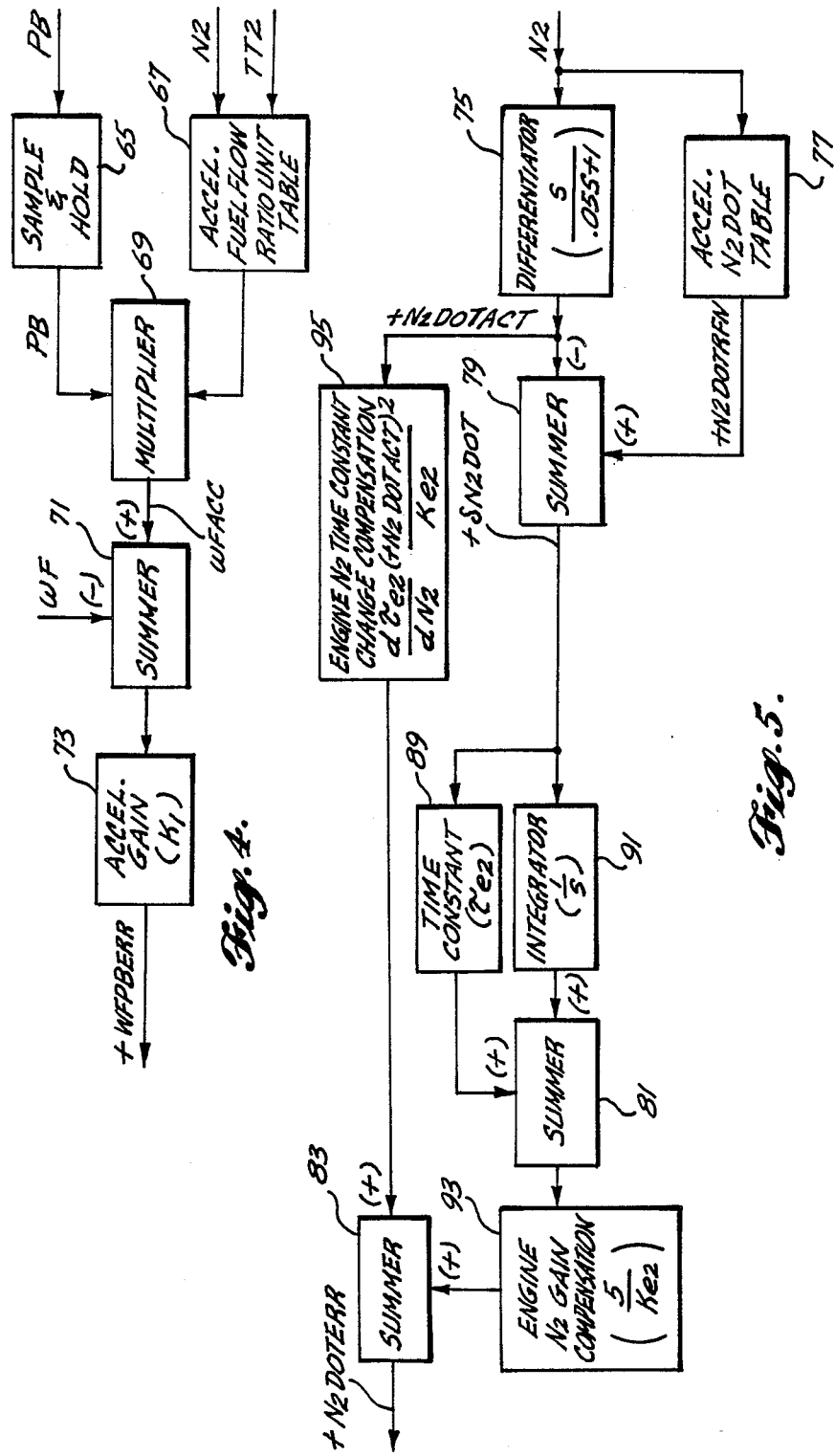
FIG. 4 is a block diagram of an acceleration fuel flow subsystem suitable for use in FIG. 2.
FIG. 5 is a block diagram of an acceleration rotor speed rate of change subsystem suitable for use in FIG. 2.

As will be better understood from the following description of the acceleration and deceleration fuel flow subsystems illustrated in FIGS. 4 and 7, the acceleration and deceleration fuel flow subsystems 45 and 53 use conventional control laws to combine and compensate their respective inputs in a manner that produces maximum acceleration and deceleration fuel flow transient error (+WFPBERR and −WFPBERR) signals. The +WFPBERR signal is applied to one input of the low select circuit 49 and the −WFPBERR signal is applied to one input of the high select circuit 57.

As will be better understood from the following description of the acceleration and deceleration rotor speed rate of change subsystems illustrated in FIGS. 5 and 8, the acceleration and deceleration rotor speed rate of change subsystems 47 and 55 are also based on conventional control laws. These subsystems differentiate the N2 signal, compensate the result and produce rotor speed transient error (N2DOTERR) signals. More specifically, the acceleration rotor speed change subsystem 47 produces a +N2DOTERR signal and the deceleration rotor speed change subsystem 55 produces a −N2DOTERR signal. +N2DOTERR is applied to the second input of a low select circuit 49 and −N2DOTERR is applied to the second input of the high select circuit 57.

The acceleration throttle lever angle rate of change subsystem 51 receives the output of the low select circuit 49, denoted ACCERR, and a steady state engine pressure ratio error signal denoted EPRERR. The deceleration throttle lever angle rate of change subsystem 59 receives the output of the high select circuit 57, denoted DECERR and EPRERR. The low and high select circuit outputs are also applied to the engine controller subsystem 63. As will be better understood from the following description of the engine controller subsystem illustrated in FIG. 11, the outputs of the low and high select circuits (ACCERR or DECERR) form transient error signals that limit WFDOT in a manner that prevents WF from exceeding the limits imposed by the values of the acceleration and deceleration fuel flow and the acceleration and deceleration rate of change that created these signals.

Figure 6:
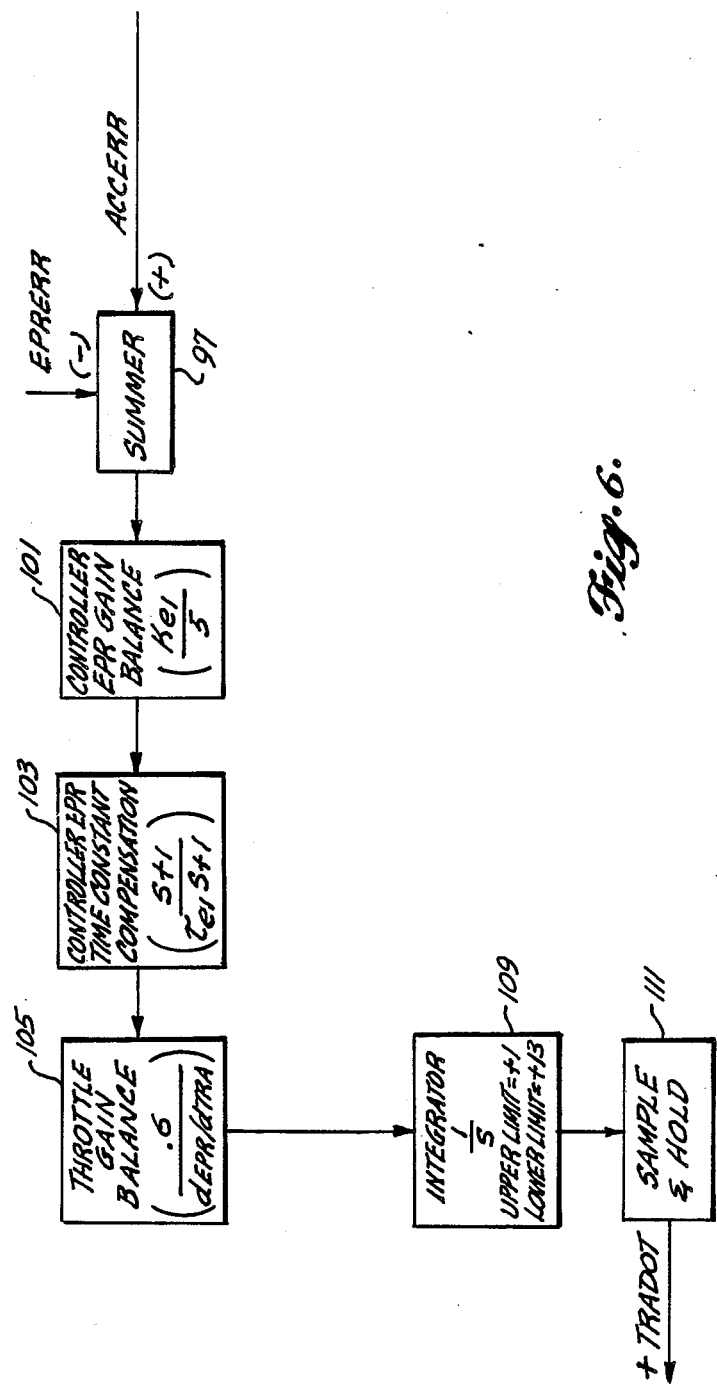
FIG. 6 is a block diagram of an acceleration throttle lever angle rate of change subsystem suitable for use in FIG. 2.

As will be better understood from the following description of the acceleration and deceleration throttle lever angle rate of change subsystems 51 and 59 illustrated in FIGS. 6 and 9, the acceleration and deceleration throttle lever angle rate of change subsystems combine their steady state and transient error input signals in a manner that produces limiting error signals that define the maximum advance and retard thrust resolver angle change that can occur without exceeding the response capability of the engine (+TRADOT and −TRADOT). The limiting error signals, i.e., +TRADOT and −TRADOT, are applied to the autothrottle subsystem 61.

Figure 10:
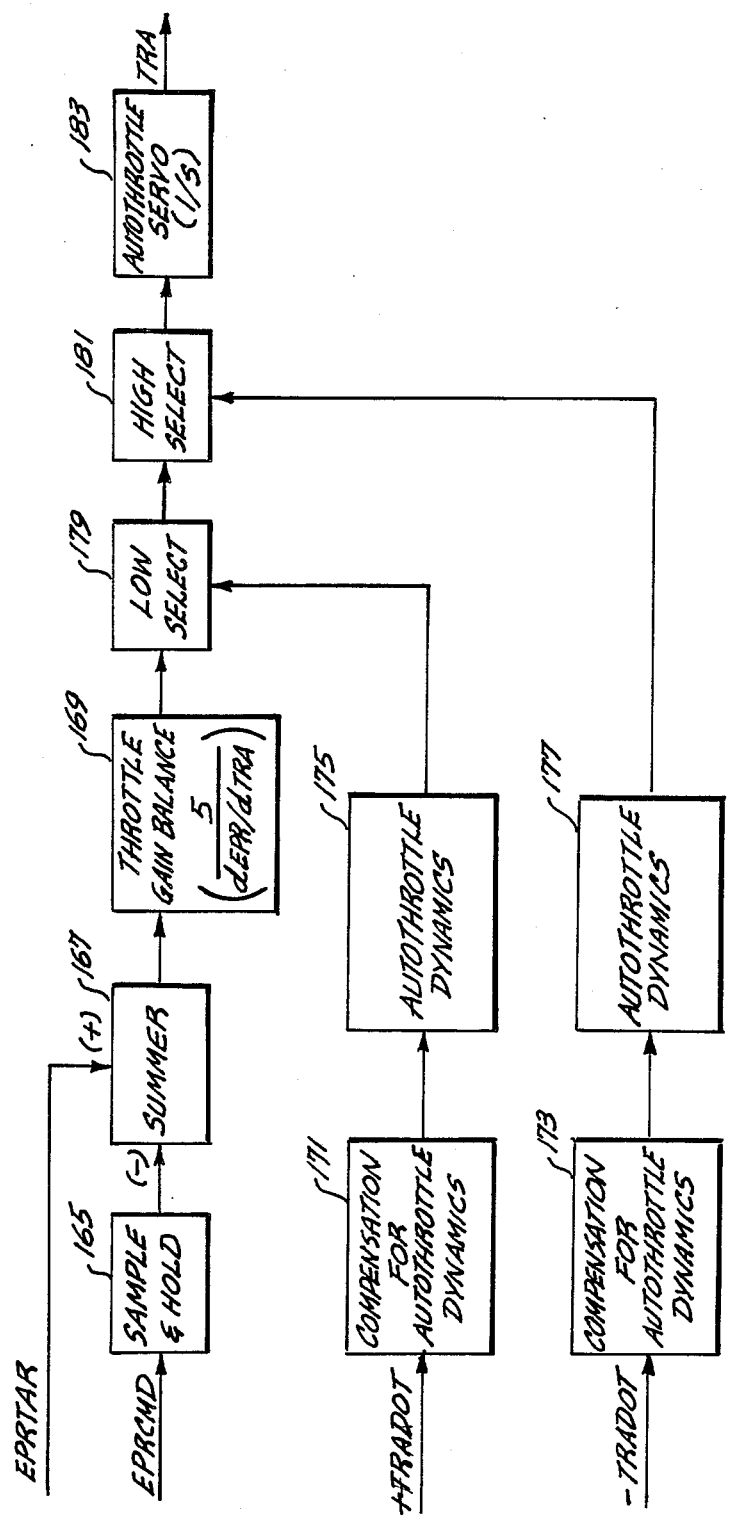
FIG. 10 is a block diagram of an autothrottle subsystem suitable for use in FIG. 2; and, FIG. 11 is a block diagram of an engine controller subsystem suitable for use in FIG. 2.

As will be better understood from the following description of the autothrottle subsystem illustrated in FIG. 10, the autothrottle subsystem 61 produces a throttle angle resolver signal (TRA). TRA is applied to the engine controller subsystem 63. Typically, TRA is controlled by the autothrottle to drive the engine to the EPR target (EPRTAR) value. This is accomplished by driving the autothrottle servo 23 based on the difference between EPRTAR and a commanded EPR (EPRCMD). The autothrottle servo drive is based on +TRADOT or −TRADOT if the EPRTAR signal requests a TRA rate of change that will cause throttle movement to exceed the engine's response capability.

As will be readily understood by those skilled in the aircraft control systems art from FIG. 2 and the foregoing description, in essence, a coordinated engine throttle control formed in accordance with the invention includes a plurality of limiting feedback loops. Which of the loops controls in an actual transient situation is dependent upon the status of several engine parameters during the transient. If the command is an acceleration command that will cause certain hereinafter described reference values (WFPBA or +N2DOTRFN) to be exceeded, the lower of the +WFPBERR and +N2DOTERR signals will control fuel flow (WF). Similarly, if the command is a deceleration command that will cause certain other hereinafter described reference values (WFPBD or −N2DOTRFN) to be exceeded, the higher of the −WFPBERR and −N2DOTERR signals will control fuel flow (WF). If an acceleration change is such that the throttle lever angle rate of change would cause the engine to exceed its response capability, +TRADOT will control TRA so that this result will not occur. Similarly, if a deceleration command would cause the throttle lever angle rate change to exceed the response capability of the engine, −TRADOT will control TRA so that this result will not occur.

FIGS. 4–11 are functional block diagrams that illustrate preferred embodiments of various subsystems illustrated in FIG. 2 and heretofore described. Because the WF to certain engine parameter (N2, PB and EPR) transfer functions of various circuits included in the subsystems are compensated for in various subsystems, attention is first directed to FIG. 3, which depicts the simulation of the transfer function of the relevant parameters. The transfer functions are simulated with a gain and a lag circuit. The gain is derived from the engine steady state relationship of the parameter of interest (e.g., EPR, N2, PB) to fuel flow. The lag time constant simulates the predominant time constant of the engine during transients and is a function of N2. The transfer function relating WF to actual EPR (EPRACT) is:

$$\frac{K_{e1}}{\tau_{e1}^s + 1} \quad (1)$$

The transfer function relating WF to N2 is:

$$\frac{K_{e2}}{\tau_{e2}^s + 1} \quad (2)$$

The transfer function relating WF to PB is:

$$\frac{K_{e3}}{\tau_{e3}^s + 1} \quad (3)$$

FIG. 4 is a block diagram of an acceleration fuel flow subsystem suitable for use in the embodiment of the invention illustrated in FIG. 2. The acceleration fuel flow subsystem illustrated in FIG. 4 comprises: a sample and hold circuit 65; an acceleration fuel flow ratio unit table 67; a multiplier 69; a summer 71; and, an acceleration gain circuit 73. (As noted above, these circuit descriptors are to be taken as descriptive and not as limiting because the invention can be implemented in software as well as hardware form). The sample and hold circuit 65 receives the PB signal generated by the burner pressure sensor associated with the engine. In a conventional manner, the sample and hold circuit 65 periodically samples the PB signal and holds the sampled value until the next sample is taken. The output (PB) of the sample and hold circuit 65 is applied to one input of the multiplier 69.

The acceleration fuel flow ratio unit table 67 stores maximum or reference fuel flow to burner pressure ratio values (WFPBA) as a function of N2 and TT2. The stored values correspond to the traditional acceleration cam value of a hydromechanical control system. The values can be stored in any suitable memory, such as an erasable programmable read only memory (EPROM), for example. The N2 and TT2 signals are applied to the acceleration fuel flow ratio unit table 67 and control the "looked up" value produced at the output of the table. The output of the acceleration fuel flow ratio unit table 67 is applied to the second input of the multiplier 69. Thus, the multiplier multiplies current burner pressure (PB) times maximum fuel flow to burner pressure ratio (WFPBA) based on the current values of N2 and TT2. The result of the multiplication is an acceleration maximum fuel flow signal (WFACC).

The summer 71 is a two-input summer having a positive (+) input and a negative (−) input. The output of the multiplier 69 (WFACC) is applied to the positive (+) input of the summer 71. The fuel flow signal (WF) is applied to the negative (−) of the summer 71. Thus, the summer produces an output signal whose value is the difference between the acceleration maximum fuel flow that the engine can accept based on the current value of N2 and TT2 (WFACC) and actual fuel flow (WF). The output of the summer is applied to the acceleration gain circuit 73, where it is multiplied by a gain factor, denoted $K_1$. The output of the acceleration gain circuit 73 is the +WFPBERR signal previously described. As previously noted, +WFPBERR denotes the acceleration maximum rate of change in fuel flow that the engine can accept under present operating conditions, without exceeding the maximum fuel flow ratio unit schedule.

FIG. 5 is a block diagram of an acceleration rotor speed rate of change subsystem suitable for use in the embodiment of the invention illustrated in FIG. 2. The acceleration rotor speed rate of change subsystem illustrated in FIG. 5 includes: a differentiator 75; an acceleration N2DOT table 77; three summers 79, 81 and 83; a time constant circuit 89; an integrator 91; an engine N2 gain compensation circuit 93; and, an engine N2 time constant change compensation circuit 95.

The output of the sample and hold circuit 43 (FIG. 2) (i.e., the held N2 signal) is applied to the input of the differentiator 75 and to the input of the acceleration N2DOT table 77. The differentiator 75 differentiates the N2 signal to produce an actual rate of change of core rotor speed signal, denoted +N2DOTACT. The transfer function of the differentiator is:

$$\frac{s}{.05\,s + 1} \quad (4)$$

The acceleration N2DOT table 77 stores the maximum positive rate of change of core rotor speed values based on N2 values. In other words, each N2 value has a maximum positive rate of change of core rotor speed value associated with it. The output of the acceleration N2DOT table 77 is denoted +N2DOTRFN, to signify it is an acceleration (+) reference value. (As used in this descripton in connection with signals, the + denotes that signal is acceleration related. The + does not necessarily mean that the magnitude of the related signal is positive.)

The first summer 79 is a two-input summer having a positive (+) input and a negative (−) input. The output of the differentiator 75 (i.e., +N2DOTACT) is applied to the negative input and the output of the acceleration N2DOT table 77 (i.e., +N2DOTRFN) is applied to the positive input. Thus, the output of the first summer 79 is the difference between +N2DOTACT and +N2DOTRFN. This signal is denoted +δN2DOT. The output of the differentiator 75 (i.e., +N2DOTACT) is also applied to the input of the engine N2 time constant change compensation circuit 95.

The output of the first summer 79 is applied to the input of the time constant circuit 89 and to the input of the integrator 91. Both inputs of the second summer 81 are positive. The output of the time constant circuit 89 is applied to one input of the second summer and the output of the integrator 91 is applied to the second input of the second summer 81. The time constant circuit has a time constant equal to the time constant of the simulated WF to N2 transfer function of the engine—$\tau_{e2}$. See FIG. 3. The time constant circuit 89 multiplies the output of the first summer ($+\delta$N2DOT) by $\tau_{e2}$ while the integrator 91 integrates $+\delta$N2DOT. The second summer sums the output of the integrator and the output of the time constant circuit 89. In essence, the combination of the time constant circuit 89, the integrator 91 and the second summer 81 form a lead integrator network that provides compensation for the time constant of the WF to N2 transfer function of the engine.

The output of the second summer 81 is applied to the input of the engine N2 gain compensation circuit 93 wherein it is multiplied by a compensation factor having the value $5/K_{e2}$. This circuit compensates for the gain ($K_{e2}$) of the WF to N2 transfer function of the engine, providing an overall loop gain of 5.

Both of the inputs of the third summer 83 are positive. The output of the engine N2 gain compensation circuit 93 is applied to one input of the third summer 83 and the output of the engine N2 time constant change compensation circuit 95 is applied to the second input of the third summer 83. The output of the third summer 83 is the +N2DOTERR signal applied to the second input of the low select circuit 49 illustrated in FIG. 2 and described above.

The engine N2 time constant change compensation circuit compensates for the fact that the N2 time constant varies. The engine N2 time constant change compensation circuit provides a signal that is added to the output of the engine N2 gain compensation circuit 93 to compensate for this variation. More specifically, the compensation value generated by the engine N2 time constant change compensation circuit is created in accordance with the expression:

$$\frac{d\tau_{e2}}{dN2} \cdot \frac{(+N2DOTACT)^2}{K_{e2}} \quad (5)$$

The values of $d\tau_{e2}/dN2$ and $K_{e2}$ are stored in the controller. $(+N2DOTACT)^2$ is determined by squaring the output of the differentiator.

In essence, the acceleration rotor speed rate of change subsystem 47 illustrated in FIG. 5 provides compensation for three WF to N2 transfer function factors. The time constant circuit 89, the integrator 91 and the second summer 81 provide compensation for the time constant of the WF to N2 transfer function. The engine N2 time constant change compensation circuit 95 provides compensation for changes in the time constant of the WF to N2 tranfer function and the engine N2 gain compensation circuit 93 provides compensation for the gain of the WF to N2 transfer function.

FIG. 6 is a block diagram of an acceleration throttle lever angle rate of change subsystem suitable for use in the embodiment of the invention illustrated in FIG. 2. The acceleration throttle lever angle rate of change subsystem illustrated in FIG. 6 comprises: a summer 97; a controller EPR gain balance circuit 101; a controller EPR time constant compensation circuit 103; a throttle gain balance circuit 105; an integrator 109; and, a sample and hold circuit 111. The summer 97 is a two-input summer having a positive (+) input and a negative (−) input. The output of the low select circuit 49 (ACCERR) is applied to the positive (+) input of the summer 97. The steady state EPR error signal produced by the engine controller 63 in the manner hereinafter described (EPRERR) is applied to the negative (−) input of the summer 97.

As discussed above, +WFPBERR is a transient acceleration fuel flow error signal that represents the acceleration maximum fuel flow ratio units that the engine can respond to based on the current values of PB, N2 and TT2. +N2DOTERR is a transient maximum acceleration erro signal that represents the maximum high rotor speed rate of change that the engine can achieve based on the current value of N2. The lowest of these transient error signal values, as determined by the low select circuit 49 (FIG. 2), forms the ACCERR signal that is subtractively summed with the steady state EPR error EPRERR signal generated by the engine controller subsystem 63 in the manner hereinafter described. The steady state EPR error signal is, in essence, the steady state error between the actual EPR value (EPRACT) and a commanded EPR value (EPRCMD) based on throttle position (TRA). EPRERR is compensated for the time constant and gain of the WF to EPRACT transfer function of the engine. Thus, the output of the summer 97 is the uncompensated difference between the transient error (ACCERR) and the steady state EPR error (EPRERR).

The output of the summer 97 is applied to the input of the controller EPR gain balance circuit 101. The gain of the controller EPR loop transfer function is balanced in the controller EPR gain balance circuit 101 by multiplying the output of the summer 97 by the factor equal to $K_{e1}/5$ where, as shown in FIG. 3, $K_{e1}$ is the gain of the simulated WF to EPRACT transfer function.

The output of the controller EPR gain balance circuit 101 is applied to the input of the controller EPR time constant compensation circuit 103 and the output of the controller EPR time constant compensation circuit 103 is applied to the input of the throttle gain balance circuit 105.

The controller EPR time constant compensation circuit 103 provides lead and lag compensation. The transfer function of the controller EPR time constant compensation circuit 103 is:

$$\frac{s+1}{\tau_{e1}^s + 1} \quad (6)$$

The lead time constant is 1.0 and the lag time constant is the time constant of the simulated WF to EPRACT transfer function—$\tau_{e1}$. The lag time constant cancels a lead created by the hereinafter described engine controller subsystem 63.

The throttle gain balance circuit 105 changes the magnitude of the output of the controller EPR time constant circuit 103 by an amount equal to 0.6 divided by the derivative of EPR with respect to TRA. This derivative is calculated in the controller. The output of the throttle gain balance circuit 105 is applied to the input of the integrator 109 and the output of the integrator 109 is applied to the input of the sample and hold circuit 111.

The integration of the signal produced at the output of the throttle gain balance circuit 105 creates the previously described +TRADOT signal. This signal, which is limited to an upper value of +13° per second and a lower value of +1° per second is sampled and held at sequential intervals by the sample and hold circuit 111 for use by the autothrottle subsystem 61 in the manner hereinafter described. Thus, +TRADOT is the compensated and integrated difference between transient error (ACCERR) and the steady state EPR error (EPRERR).

The deceleration fuel flow subsystem 53, the deceleration rotor speed rate of change subsystem 55 and the deceleration throttle lever angle rate of change subsystem 59 are, in essence, images of the acceleration fuel flow subsystem 45, the acceleration rotor speed rate of change subsystem 47 and the acceleration throttle lever angle rate of change subsystem 51, respectively.

FIG. 7 is a block diagram of a deceleration fuel flow subsystem suitable for use in the embodiment of the invention illustrated in FIG. 2. The deceleration fuel flow subsystem illustrated in FIG. 7 comprises: a sample and hold circuit 121; a deceleration fuel flow ratio unit table 123; a multiplier 125; a summer 127; and, a deceleration gain circuit 129. The sample and hold circuit 121 receives the PB signal generated by the burner pressure sensor associated with the engine. In a conventional manner, the sample and hold circuit 121 periodically samples the PB signal and holds the sampled value until the next sample is taken. The output (PB) of the sample and hold circuit 121 is applied to one input of the multiplier 125.

The deceleration fuel flow ratio unit table 123 stores minimum or reference fuel flow to burner pressure ratio values (WFPBD) as a function of N2 and TT2. The stored values correspond to the traditional deceleration cam value of a hydromechanical control system. The values can be stored in any suitable memory, such as an erasable programmable read only memory (EPROM), for example. The N2 and TT2 signals are applied to the deceleration fuel flow ratio unit table 123 and control the "looked up" value produced at the output of the table. The output of the deceleration fuel flow ratio unit table 123 is applied to the second input of the multiplier 125. Thus, the multiplier multiplies current burner pressure (PB) times minimum fuel flow to burner pressure ratio (WFPBD) based on the current values of N2 and TT2. The result of the multiplication is a deceleration minimum fuel flow signal (WFDEC).

The summer 127 is a two-input summer having a positive (+) input and a negative (−) input. The output of the multiplier 125 (WFDEC) is applied to the positive (+) input of the summer 127. The fuel flow signal (WF) is applied to the negative (−) of the summer 127. Thus, the summer produces an output signal whose value is the difference between the deceleration minimum fuel flow that the engine can accept based on the current value of N2 and TT2 (WFDEC) and actual fuel flow (WF). The output of the summer is applied to the deceleration gain circuit 129, where it is multiplied by a gain factor, denoted $K_2$. The output of the deceleration gain circuit 129 is the −WFPBERR signal previously described. As previously noted, −WFPBERR denotes the deceleration maximum rate of change in fuel flow that the engine can accept under present operating conditions, without exceeding the minimum fuel flow ratio unit schedule.

FIG. 8 is a block diagram of a deceleration rotor speed rate of change subsystem suitable for use in the embodiment of the invention illustrated in FIG. 2. The deceleration rotor speed rate of change subsystem illustrated in FIG. 8 includes: a differentiator 131; a deceleration N2DOT table 133; three summers 135, 136 and 137; a time constant circuit 141; an integrator 143; an engine N2 gain compensation circuit 145; and, an engine N2 time constant change compensation circuit 147.

The output of the sample and hold circuit 43 (FIG. 2) (i.e., the held N2 signal) is applied to the input of the differentiator 131 and to the input of the deceleration N2DOT table 133. The differentiator 131 differentiates the N2 signal to produce an actual rate of change of core rotor speed signal, denoted −N2DOTACT. The transfer function of the differentiator is:

$$\frac{s}{.05s + 1} \quad (7)$$

The deceleration N2DOT table 133 stores the maximum positive rate of change of core rotor speed values based on N2 values. In other words each N2 value has a maximum positive rate of change of core rotor speed value associated with it. The output of the deceleration N2DOT table 133 is denoted −N2DOTRFN, to signify it is a deceleration (−) reference value. (As with the acceleration subsystem description, the polarity notation signifies that the signal is related to deceleration. It does not necessarily signify that the magnitude of the signal is negative.)

The first summer 135 is a two-input summer having a positive (+) input and a negative (−) input. The output of the differentiator 131 (i.e., −N2DOTACT) is applied to the negative input and the output of the deceleration N2DOT table 133 (i.e., −N2DOTRFN) is applied to the positive input. The output of the first summer 135 is the difference between −N2DOTACT and −N2DOTRFN. This signal is denoted −δN2DOT. The output of the differentiator 131 (i.e., −N2DOTACT) is also applied to the input of the engine N2 time constant change compensation circuit 147.

The output of the first summer 135 (−δN2DOT) is applied to the input of the time constant circuit 141 and to the input of the integrator 143. Both inputs of the second summer 136 are positive. The output of the time constant circuit 141 is applied to one input of the second summer 136 and the output of the integrator 143 is applied to the second input of the second summer 136. The time constant circuit has a time constant equal to the time constant of the simulated WF to N2 transfer function of the engine—$\tau_{e2}$. See FIG. 3. The time constant circuit 141 multiplies the output of the first summer (−δN2DOT) by $\tau_{e2}$ while the integrator 91 integrates −δN2DOT. The second summer 136 sums the output of the integrator and the output of the time constant circuit 141. In essence, the combination of the time constant circuit 141, the integrator 143 and the second summer 136 form a lead integrator network that provides compensation for the time constant of the WF to N2 transfer function of the engine.

The output of the second summer 136 is applied to the input of the engine N2 gain compensation circuit 145 wherein it is multiplied by a compensation factor having the value $5/K_{e2}$. This circuit compensates for the gain ($K_{e2}$) of the WF to N2 transfer function of the engine, providing an overall loop gain of 5.

Both of the inputs of the third summer 137 are positive. The output of the engine N2 gain compensation circuit 145 is applied to one input of the third summer 137 and the output of the engine N2 time constant change compensation circuit 147 is applied to the second input of the third summer 137. The output of the third summer 137 is the −N2DOTERR signal applied to the second input of the high select circuit 57 illustrated in FIG. 2 and described above.

The engine N2 time constant change compensation circuit compensates for the fact that the N2 time constant varies. As with the acceleration subsystems, the engine N2 time constant change compensation circuit 147 provides a signal that is added to the output of the engine N2 gain compensation circuit 145 to compensate for this variation. More specifically, the compensation value generated by the engine N2 time constant change compensation circuit 147 is created in accordance with the expression:

$$\frac{d\tau_{e2}}{dN2} \frac{(-N2DOTACT)^2}{K_{e2}} \tag{8}$$

The value of $d\tau_{e2}/dN2$ and $K_{e2}$ are stored in the controller. $(-N2DOTACT)^2$ is determined by squaring the output of the differentiator.

In essence, the deceleration rotor speed rate of change subsystem 55, illustrated in FIG. 8 provides compensation for three WF to N2 transfer function factors. The time constant circuit 141, the integrator 143 and the second summer 136 provide compensation for the time constant of the WF to N2 transfer function. The engine N2 time constant change compensation circuit 147 provides compensation for changes in the time constant of the WF to N2 transfer function and the engine N2 gain compensation circuit 145 provides compensation for the gain of the WF to N2 transfer function.

FIG. 9 is a block diagram of a deceleration throttle lever angle rate of change subsystem suitable for use in the embodiment of the invention illustrated in FIG. 2. The deceleration throttle lever angle rate of change subsystem illustrated in FIG. 9 comprises: a summer 149; a controller EPR gain balance circuit 153; a controller EPR time constant compensation circuit 155; a throttle gain balance circuit 157; an N2DOT table change compensation circuit 159; an integrator 161; and, a sample and hold circuit 163. The summer 149 is a two-input summer having a positive (+) input and a negative (−) input. The output of the high select circuit 57 (DECERR) is applied to the positive (+) input of the summer 149. The steady state EPR error signal produced by the engine controller 63 in the summer hereinafter described (EPRERR) is applied to the negative (−) input of the first summer 149.

As discussed above, −WFPBERR is a transient deceleration fuel flow error signal that represents the deceleration minimum fuel flow ratio units that the engine can respond to based on the current values of PB, N2 and TT2. −N2DOTERR is a transient maximum deceleration error signal that represents the maximum high rotor speed rate of change that the engine can achieve based on the current value of N2. The highest of these transient error signal values, as determined by the high select circuit 57 (FIG. 2), forms the DECERR signal that is subtractively summed with the steady state EPR error (EPRERR) signal generated by the engine controller subsystem 63 in the manner hereinafter described. The steady state EPR error signal is, in essence, the steady state error between the actual EPR value (EPRACT) and a commanded EPR value (EPRCMD) based on throttle position. EPRERR is compensated for the time constant and gain of the WF to EPRACT transfer function of the engine. Thus, the output of the summer 149 is the uncompensated difference between the transient error (DECERR) and the steady state EPR error (EPRERR).

The output of the summer 149 is applied to the input of the controller EPR gain balance circuit 153. The gain of the controller EPR loop transfer function is balanced in the controller EPR gain balance circuit 101 by multiplying the output of the summer 97 by the factor $K_{e1}/5$ where, as shown in FIG. 3, $K_{e1}$ is the gain of the simulated WF to EPRACT transfer function.

The output of the controller EPR gain balance circuit 153 is applied to the input of the controller EPR time constant compensation circuit 155 and the output of the controller EPR time constant circuit 155 is applied to the input of the throttle gain balance circuit 157.

The controller EPR time constant compensation circuit 155 provides lead and lag compensation. The transfer function of the controller EPR time constant compensation circuit 155 is:

$$\frac{s+1}{\tau_{e1}^s + 1} \tag{9}$$

The lead time constant is 1.0 and the lag time constant is the time constant of the simulated WF to EPRACT transfer function—$\tau_{e1}$. The lag time constant cancels a lead created by the hereinafter described engine controller subsystem 63.

The throttle gain balance circuit 157 changes the magnitude of the output of the controller EPR time constant circuit 155 by an amount equal to 0.6 divided by the derivative of EPR with respect to TRA. This derivative is calculated by the controller. The output of the throttle gain balance circuit 157 is applied to the input of the integrator 161 and the output of the integrator is applied to the input of the sample and hold circuit 163.

The integration of the signal produced at the output of the throttle gain balance circuit 157 creates the previously described −TRADOT signal. This signal, which is limited to a lower value of −13° per second and an upper value of −1° per second, is sampled and held at sequential intervals by the sample and hold circuit 163 for use by the autothrottle subsystem 61 in the manner hereinafter described. Thus, −TRADOT is the compensated and integrated difference between the transient error (DECERR) and steady state EPR error (EPRERR).

For ease of illustration and description, the acceleration fuel flow subsystem 45, the acceleration rotor speed rate of change subsystem 47 and the acceleration throttle lever angle rate of change subsystem 51, and the deceleration fuel flow subsystem 53, the deceleration rotor speed rate of change subsystem 55 and the deceleration throttle lever angle rate of change subsystem 59 have been illustrated and described as entirely separate subsystems. Contrariwise, in actual embodiments of the invention, one or more of the functions of the subsystems can be combined. In "software" embodiments of the invention in which the subsystems are implemented in subroutine form, common subroutines can be used to perform the functions of related acceleration and deceleration subsystems. In hardware embodiments of the invention, some of the circuitry can be made common to subsystems. For example, the N2 differentiator of both the acceleration rotor speed rate of change subsystem 47 and the deceleration rotor speed rate of change subsystem 55 could be formed by a single circuit with the output being applied to the first summers of both the acceleration rotor speed rate of change subsystem 47 and the deceleration rotor speed rate of change subsystem 55.

The autothrottle subsystem illustrated in FIG. 10 comprises: a sample and hold circuit 165; a two-input summer 167; a throttle gain balance circuit 169; two compensation for autothrottle dynamics circuits 171 and 173; autothrottle dynamic blocks 175 and 177; a low select circuit 179; a high select circuit 181; and, an autothrottle servo 183. An externally created EPR command (EPRCMD) signal, which is produced by the engine controller subsystem 63 in the manner hereinafter described, is applied to the input of the sample and hold circuit 65.

The summer 167 has a positive (+) input and a negative (−) input. The output of the sample and hold circuit 65 is applied to the negative (−) input of the summer 167. The EPR target (EPRTAR) signal produced by the autothrottle is applied to the positive (+) input of the summer 167. The EPR target signal is used here as a command signal by the autothrottle to control the speed, or some other aircraft parameter causing either an increase or a decrease in engine thrust.

The output of the summer 167, i.e., the difference between EPRTAR and EPRCMD, is applied to the throttle gain balance circuit 169. The throttle gain balance circuit changes the magnitude of the summer output in a manner that balances the gain of the autothrottle. The multiplication factor is 5 divided by the differential of EPR with respect to TRA (dEPR/dTRA), as shown in FIG. 10. The output of the throttle gain balance circuit 169 is applied to one input of the low select circuit 179.

+TRADOT is applied to the input of the first compensation for auto dynamics circuit 171. The first compensation for auto dynamic circuit 171 compensates +TRADOT for the acceleration dynamics of the autothrottle. The acceleration autothrottle dynamics are represented by a block 175 shown as connected to the output of the compensation for autothrottle dynamic circuit 171.

The +TRADOT signal, compensated for autothrottle dynamics, is applied to the second input of the low select circuit 179. The low select circuit selects the lowest of its two respective inputs—either the difference between the commanded EPR (EPRCMD) and the target EPR (EPRTAR) balanced for throttle gain or +TRADOT compensated for autothrottle dynamics. In essence, +TRADOT forms a limiting error signal that limits the rate of change of throttle position (TRA). If the difference between EPRTAR and EPRCMD exceeds the acceleration response capability of the aircraft, +TRADOT forms the output of the low select circuit 179. If the difference between EPRTAR and EPRCMD does not exceed the acceleration response capability of the aircraft, the difference between EPRTAR and EPRCMD forms the output of the low select circuit 179. The output of the low select circuit 179 is connected to one input of the high select circuit 181.

−TRADOT is connected to the input of the second compensation for autothrottle dynamics circuit 173. The second compensation for autothrottle dynamics circuit 171 compensates −TRADOT for deceleration autothrottle dynamics in the same way that the first compensation for autothrottle dynamics circuit compensated +TRADOT for acceleration autothrottle dynamics. Deceleration autothrottle dynamics are depicted by the second autothrottle dynamics block 177. The autothrottle compensated value of −TRADOT is applied to the second input of the high select circuit 181. The output of the high select circuit 181 is applied to the autothrottle servo 183.

Like +TRADOT, −TRADOT forms a limiting error signal that limits the response of the autothrottle subsystem. If the difference between EPRTAR and EPRCMD is lower than +TRADOT, the high select circuit will determine if the difference between EPRTAR and EPRCMD is greater or less than −TRADOT. IF the value is greater than −TRADOT, the high select circuit will apply the difference to the autothrottle servo 183. Contrariwise, if the difference between EPRTAR and EPRCMD is less than −TRADOT the high select circuit will apply −TRADOT to the autothrottle servo 183.

The autothrottle servo 183 is an integrator that integrates the output of the high select circuit. The result of the integration is the signal, denoted TRA, that represents the throttle resolver angle.

Figure 11:
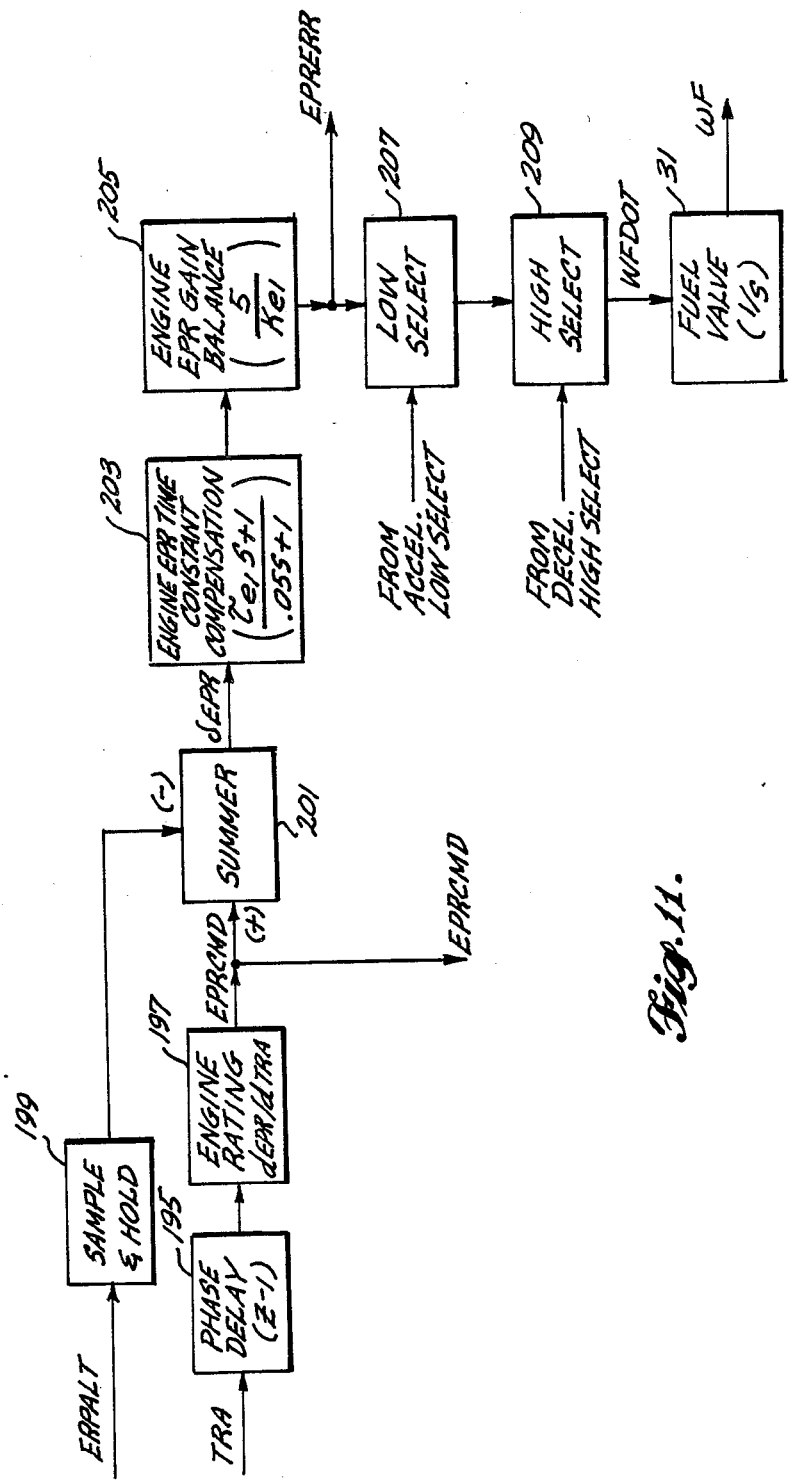

FIG. 11 is a block diagram of an engine controller subsystem suitable for use in the embodiment of the invention illustrated in FIG. 2. The engine controller subsystem illustrated in FIG. 11 comprises: a phase delay circuit 195; an engine rating circuit 197; a sample and hold circuit 199; a two-input summer 201; an engine EPR time constant compensation circuit 203; an engine EPR gain balance circuit 205; a low select circuit 207; a high select circuit 209; and, the fuel valve 31. The throttle resolver angle (TRA) signal produced by the autothrottle subsystem 61 in the manner heretofore described is applied through the phase delay circuit 195 to the engine rating circuit 197. The phase delay circuit phase delays TRA by a predetermined value $(Z^{-1})$—0.05 seconds, for example. The engine rating circuit multiplies the delayed TRA signal by a value equal to the derivative of EPR with respect to TRA (dEPR/dTRA). The result of the multiplication is the EPR command (EPRCMD) signal heretofore described.

The summer 201 has a positive (+) input and a negative (−) input. The EPRCMD is applied to the positive (+) input of the summer 201. The actual EPR (EPRACT) signal produced by the EPR sensor associated with the engine is applied to the input of the sample and hold circuit 199. The output of the sample and hold circuit is applied to the negative (−) input of the summer 201. The sample and hold circuit samples EPRACT at regular intervals and stores the result in a conventional manner. The output of the summer 201 is an EPR error signal denoted δEPR. This signal is the difference between the commanded value of EPR (EPRCMD) and the actual EPR value (EPRACT). δEPR is applied to the input of the engine EPR time constant compensation circuit 203.

The engine EPR time compensation circuit is a lead-/lag filler circuit having the transfer function:

$$\frac{\tau_{e1}^s+1}{.05\,s+1} \qquad (10)$$

The engine EPR time constant compensation circuit compensates for the time constant of the simulated WF to EPR transfer function of the engine.

The output of the engine EPR time constant compensation circuit 203 is applied to the input of the engine EPR gain balance circuit 205, which balances the signal for the gain of the simulated WF to EPR transfer function of the engine by multiplying the output of the engine EPR time constant compensation circuit by $5/K_{e1}$, providing an overall loop gain of 5.

The output of the engine EPR gain balance circuit 205 is the steady state EPR error (EPRERR) signal applied to the acceleration and deceleration autothrottle lever angle rate change subsystems 51 and 59 in the manner heretofore described. The EPRERR signal is also applied to one input of the low select circuit 207. The second input of the low select circuit 207 is the output from the acceleration low select circuit 49. The low select circuit selects the lowest of its two inputs and applies it to an output. Thus, if the EPR error signal is less than the limiting error signal (ACCERR) produced by the acceleration low select circuit 49, EPERR is applied to the output of the low select circuit 207. Contrariwise, if ACCERR is lower than EPRERR, that signal is applied to the output of low select circuit 207.

The output of the low select circuit 207 is applied to one input of the high select circuit 209. The output of the deceleration high select circuit is applied to the second input of the high select circuit 209. As with the acceleration low select circuit, the output of the deceleration high select circuit (DECERR) is a limiting error signal. If the output of the low select circuit, e.g., EPRERR, is greater than the output of the acceleration high select circuit (DECERR), EPRERR forms the output of the high select circuit. Contrariwise, if EPRERR is less than the output of the deceleration high select circuit (DECERR), the output of the deceleration high select circuit forms the output of the high select circuit 209. The output of the high select circuit is denoted WFDOT. WFDOT is applied to the fuel valve 31. The fuel valve integrates WFDOT. The output of the fuel valve is the fuel flow whose value is sensed by a fuel flow sensor to create the WF signal applied to the acceleration and deceleration fuel flow subsystems 45 and 53 in the manner heretofore described.

As will be readily appreciated from the foregoing description, the value of WFDOT, which controls the fuel flow to the engine and, thus, the thrust produced by the engine, can either be controlled by an external control signal or by several limiting signals, all of which depend upon aircraft parameters. The limiting transient error control signals are the acceleration and deceleration maximum fuel flow ratio unit signals, +WFPBERR and −WFPBERR; and, acceleration and deceleration maximum high rotor speed rate of change signals, +N2DOTERR and −N2DOTERR.

Analogous to the transient error signals in the engine control, the +TRADOT and −TRADOT signals provide transient limits for the autothrottle system. The +TRADOT and −TRADOT limit signals result in a coordinated engine autothrottle that controls the autothrottle of a jet aircraft engine during transients (i.e., changes in speed) in a manner that prevents the throttle from leading the engine (i.e., exeeding the response capability of the engine), thus eliminating throttle overshoots.

While a preferred embodiment of the invention has been illustrated and described, it will be appreciated that various changes can be made therein without departing from the spirit and scope of the invention. In this regard, as noted above, the invention can be implemented in hardware form a software form. Further, for ease of understanding, the acceleration and deceleration subsystems have been separated. In an actual embodiment of the invention, various circuits in a hardware environment or subroutines in a software environment could be shared by both subsystems. Consequently, the invention can be practiced otherwise than as specifically described herein.

The embodiments of the invention in which an exclusive property or privilege is claimed are defined as follows:

1. A closed loop control system for controlling the autothrottle of an aircraft jet engine during transients in a manner that prevents the response capability of the engine from being exceeded, said closed loop control system comprising:
 (a) monitoring means for monitoring selected parameters of a jet engine and producing related signals, said selected parameter signals including a core rotor speed (N2) signal, a fuel flow (WF) signal, and a pressure burner (PB) signal;
 (b) storage means for storing maximum rate of change of core rotor speed values based on core rotor speed values (N2DOTRFN), said storage means coupled to said monitoring means for receiving said N2 signal and, based on said N2 signal, producing a rotor speed transient error value (N2DOTERR) that denotes the maximum rate of change of core rotor speed acceptable by said jet engine without exceeding the response capability of the engine;
 (c) computation means coupled to said monitoring means and to said storage means for:
  (1) receiving said WF, PB and N2 signals and determining a fuel flow transient error value (WFPBERR) based on said WF, PB and N2 signals that denotes the rate of change in fuel flow acceptable by said jet engine without exceeding the maximum and minimum fuel flow to pressure burner ratios of the engine;
  (2) receiving N2DOTERR; and,
  (3) producing a throttle rate of change limit (TRADOT) signal having a magnitude that is selectively based on one or the other of N2DOTERR and WFPBERR.

2. A closed loop control system as claimed in claim 1, wherein said computation means:
 (1) determines the maximum acceleration fuel flow transient error value (+WFPBERR) acceptable by said jet engine without exceeding the response capability of the engine based on the values of said WF, PB and N2 signals;
 (2) determines the maximum acceleration rotor speed transient error value (+N2DOTERR) acceptable by said jet engine without exceeding the response capability of the engine based on the value of said N2 signal;
 (3) produces an acceleration throttle limit change (+TRADOT) signal based on the lower of +WFPBERR and +N2DOTERR;
 (4) determines the maximum deceleration fuel flow transient error value (−WFPBERR) acceptable by said jet engine without exceeding the response capability of the engine based on the values of said WF, PB and N2 signals;
 (5) determines the maximum deceleration fuel flow transient error value (+N2DOTERR) acceptable by said jet engine without exceeding the response capability of the engine based on the value of said N2 signal; and, (6) produces a deceleration throttle limit change (−TRADOT) signal based on the higher of −WFPBERR and −N2DOTERR.

3. A closed loop control system as claimed in claim 2, wherein:
(a) said selected parameter signals also include an actual engine thrust parameter signal;
(b) said control means:
(1) is coupled to said monitoring means for receiving said actual engine thrust parameter signal;
(2) is coupled to an external source for receiving a target engine thrust parameter signal; and,
(3) compares the value of said actual engine thrust parameter signal with said target engine thrust parameter signal and produces a thrust error signal based on the difference therebetween;
(c) said computation means bases the value of said +TRADOT signal on the value of said thrust error signal and the value of the lower of +WFPBERR and +N2DOTERR; and,
(d) said computation means bases the value of said −TRADOT signal on the value of said thrust error signal and the value of the higher of −WFPBERR and −N2DOTERR.

4. A closed loop control system as claimed in claim 3, wherein said control means includes:
an autothrottle subsystem connected to receive said +TRADOT and −TRADOT signals and said target thrust value and, in accordance therewith, producing a throttle resolver angle (TRA) signal; and,
an engine controller connected to said autothrottle system for receiving said TRA signal and, in accordance therewith, producing a fuel flow control signal that controls fuel flow to said engine.

5. A closed loop control system as claimed in claim 4, wherein:
(a) said storage means includes tables for storing acceleration and deceleration fuel flow to burner pressure ratio values (WFPBA and WFPBD);
(b) said computation means determines the value of +WFPBERR by multiplying PB times WFPBA and summing the result (WFACC) with WF; and,
(c) said computation means determines the value of −WFPBERR by multiplying PB by WFPBD and summing the result (WFDEC) with WF.

6. A closed loop control system as claimed in claim 5, wherein said computation means provides compensation for the fuel flow (WF) to core rotor speed (N2) transfer function of said jet engine.

7. A closed loop control system as claimed in claim 6, wherein said computation means also provides compensation for the time constant of the fuel flow (WF) to core rotor speed (N2) transfer function of said jet engine.

8. A closed loop control system as claimed in claim 7, wherein said computation means also provides compensation for changes in the time constant and gain of the fuel flow (WF) to core rotor speed (N2) transfer function of said jet engine.

9. A closed loop control system as claimed in claim 8, wherein said computation means also provides compensation for the engine speed time constant and balance for engine speed gain and throttle gain.

10. A closed loop control system as claimed in claim 9, wherein said autothrottle provides compensation for the dynamics of the autothrottle and balance for the gain of the autothrottle.

11. A closed loop control system as claimed in claim 10, wherein said engine controller provides compensation for the engine speed time constant and balance for the engine speed gain.

12. A closed loop control system for controlling the autothrottle of an aircraft jet engine during transients in a manner that prevents the response capability of the engine from being exceeded, said closed loop control system comprising:
monitoring means for monitoring selected parameters of a jet engine and producing related signals, said selected parameter signals including a core rotor speed (N2) signal;
storage means for storing maximum rate of change of core rotor speed values based on core rotor speed values (N2DOTRFN), said storage means coupled to said monitoring means for receiving said N2 signal and, based on said received N2 signal, determining: (i) a maximum acceleration rotor speed transient error value (+N2DOTERR) acceptable by said jet engine without exceeding the response capability of the engine; and, (ii) a maximum deceleration rotor speed transient error value (−N2DOTERR) acceptable by said jet engine without exceeding the response capability of the engine;
computation means coupled to said storage means for: (i) receiving +N2DOTERR and producing an acceleration throttle limit change (+TRADOT) signal based on +N2DOTERR; and (ii) receiving −N2DOTERR and producing a deceleration throttle limit change (−TRADOT) signal based on −N2DOTERR; and,
control means coupled to said computation means and to said engine for receiving said +TRADOT and said −TRADOT signals and controlling engine throttle position so that it is limited by the magnitude of a selected one or the other of said +TRADOT and −TRADOT signals.

13. A closed loop control system as claimed in claim 12, wherein:
(a) said selected parameter signals also include an actual engine thrust parameter signal;
(b) said control means:
(1) is coupled to said monitoring means for receiving said actual engine thrust parameter signal;
(2) is coupled to an external source for receiving a target engine thrust parameter signal; and,
(3) compares the value of said actual engine thrust parameter signal with said target engine thrust parameter signal and produces a thrust error signal based on the difference therebetween;
(c) said computation means bases the value of said +TRADOT signal on the value of said thrust error signal and the value of +N2DOTERR; and,
(d) said computation means bases the value of said −TRADOT signal on the value of said thrust error signal and the value of −N2DOTERR.

14. A closed loop control system as claimed in claim 13, wherein said control means includes:
an autothrottle subsystem connected to receive said +TRADOT and −TRADOT signals and said target thrust value and, in accordance therewith, producing a throttle resolver angle (TRA) signal; and,
an engine controller connected to said autothrottle system for receiving said TRA signal and, in accordance therewith, producing a fuel flow control signal that controls fuel flow to said engine.

15. A closed loop control system for controlling the autothrottle of an aircraft jet engine during transients in a manner that prevents the response capability of the engine from being exceeded, said closed loop control system comprising:

monitoring means for monitoring selected parameters of a jet engine and producing related signals, said selected parameter signals including a core rotor speed (N2) signal, a fuel flow (WF) signal and a pressure burner (PB) signal;

computation means coupled to said monitoring means for receiving said WF, PB and N2 signals and determining a fuel flow transient error value (WFPBERR) based on said WF, PB and N2 signals that denotes the rate of change of fuel flow acceptable by said jet engine without exceeding the maximum and minimum fuel flow to pessure burner ratios of the engine and producing a throttle limit change (TRADOT) signal having a magnitude based on WFPBERR; and, control means coupled to said computation means and to said jet engine for receiving said TRADOT signal and controlling fuel flow to said jet engine so that it is limited by the magnitude of said TRADOT signal.

16. A closed loop control system as claimed in claim 15, wherein said computation means:

(1) determines the maximum acceleration fuel flow transient error (+WFPBERR) acceptable by said jet engine without exceeding the response capability of the engine based on the values of said WF, PB and N2 signals;

(2) produces an acceleration throttle limit change (+TRADOT) signal based on +WFPBERR;

(3) determines the maximum deceleration fuel flow transient error (−WFPBERR) acceptable by said jet engine without exceeding the response capability of the engine based on the values of said WF, PB and N2 signals; and, (4) produces a deceleration throttle limit change (−TRADOT) signal based on −WFPBERR.

17. A closed loop control system as claimed in claim 16, wherein:

(a) said selected parameter signals also include an actual engine thrust parameter signal;

(b) said control means:
  (1) is coupled to said monitoring means for receiving said actual engine thrust parameter signal;
  (2) is coupled to an external source for receiving a target engine thrust parameter signal; and,
  (3) compares the value of said actual engine thrust parameter signal with said target engine thrust parameter signal and produces a thrust error signal based on the difference therebetween;

(c) said computation means bases the value of said +TRADOT signal on the value of said thrust error signal and the value of +WFPBERR; and, (d) said computation means bases the value of said −TRADOT signal on the value of said thrust error signal and the value of −WFPBERR.

18. A closed loop control system as claimed in claim 17, wherein said control means includes:

an autothrottle subsystem connected to receive said +TRADOT and −TRADOT signals and said target thrust value and, in accordance therewith, producing a throttle resolver angle (TRA) signal; and, an engine controller connected to said autothrottle system for receiving said TRA signal and, in accordance therewith, producing a fuel flow control signal that controls fuel flow to said engine.

* * * * *

UNITED STATES PATENT AND TRADEMARK OFFICE
CERTIFICATE OF CORRECTION

PATENT NO. : 4,912,642

DATED : March 27, 1990

INVENTOR(S) : H.N. Larsen et al.

It is certified that error appears in the above-identified patent and that said Letters Patent is hereby corrected as shown below:

Column 1, line 28: Delete "oveshooting" and insert therefor --overshooting--

Column 7, lines 17-20: Delete " $\dfrac{K_{e1}}{\tau_{e1}^{s+1}}$ " and insert therefor -- $\dfrac{K_{e1}}{\tau_{e1}{s+1}}$ --

Column 7, lines 22-25: Delete " $\dfrac{K_{e2}}{\tau_{e2}^{s+1}}$ " and insert therefor -- $\dfrac{K_{e2}}{\tau_{e2}{s+1}}$ --

Column 10, lines 41-44: Delete " $\dfrac{s+1}{\tau_{e1}^{s+1}}$ " and insert therefor -- $\dfrac{s+1}{\tau_{e1}{s+1}}$ --

Column 13, line 45: Delete "summer" and insert therefor --manner--

Column 14, lines 20-23: Delete " $\dfrac{s+1}{\tau_{e1}^{s+1}}$ " and insert therefor -- $\dfrac{s+1}{\tau_{e1}{s+1}}$ --

UNITED STATES PATENT AND TRADEMARK OFFICE
CERTIFICATE OF CORRECTION

PATENT NO. : 4,912,642

DATED : March 27, 1990

INVENTOR(S) : H.N. Larsen et al.

Page 2 of 2

It is certified that error appears in the above-identified patent and that said Letters Patent is hereby corrected as shown below:

Column 16, lines 60-63: Delete "$\dfrac{\tau_{el}^{s+1}}{.05\,s+1}$" and insert therefor --$\dfrac{\tau_{el}s+1}{.05\,s+1}$--

Column 17, line 17   Delete "EPERR" and insert therefor --EPRERR--
Column 17, line 59   Delete "exeeding" and insert therefor --exceeding--
Column 17, line 67   Delete "a" and insert therefor --or--
Column 18, line 64   After "determines" delete "the"
Column 18, line 64   Delete "fuel flow" and insert therefor --rotor speed--
Column 21, line 20   Delete "pessure" and insert therefor --pressure--

Signed and Sealed this

Thirty-first Day of December, 1991

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO. : 4,912,642
DATED : March 27, 1990
INVENTOR(S) : H. N. Larsen et al.

It is certified that error appears in the above-identified patent and that said Letters Patent is hereby corrected as shown below:

| COLUMN | LINES | |
|---|---|---|
| 7 | 28-31 | Delete "$\dfrac{K_{e3}}{\tau_{e3}^{s+1}}$" and insert therefor --$\dfrac{K_{e3}}{\tau_{e3} s+1}$-- |

Signed and Sealed this

Ninth Day of March, 1993

Attest:

STEPHEN G. KUNIN

Attesting Officer

Acting Commissioner of Patents and Trademarks